(12) United States Patent
Nonaka (10) Patent No.: US 10,222,518 B2
(45) Date of Patent: Mar. 5, 2019

(54) LIGHT DIFFUSION SHEET FOR OVERLAYING, AND BACKLIGHT UNIT

(71) Applicant: KEIWA INC., Tokyo (JP)

(72) Inventor: Tadayuki Nonaka, Tokyo (JP)

(73) Assignee: Keiwa Inc., Tokyo (JP)

( * ) Notice: Subject to any disclaimer, the term of this patent is extended or adjusted under 35 U.S.C. 154(b) by 99 days.

(21) Appl. No.: 15/370,713

(22) Filed: Dec. 6, 2016

(65) Prior Publication Data

US 2017/0160446 A1 Jun. 8, 2017

(30) Foreign Application Priority Data

Dec. 7, 2015 (JP) .................................. 2015-238932
Nov. 25, 2016 (JP) .................................. 2016-228738

(51) Int. Cl.
*F21V 8/00* (2006.01)
*G02B 5/02* (2006.01)

(52) U.S. Cl.
CPC ......... *G02B 5/0242* (2013.01); *G02B 6/0051* (2013.01); *G02B 6/0053* (2013.01)

(58) Field of Classification Search
CPC ............................ G02B 5/0242; G02B 6/0053
See application file for complete search history.

(56) References Cited

U.S. PATENT DOCUMENTS

| 8,790,766 | B2 | 7/2014 | Kato et al. | |
|---|---|---|---|---|
| 2002/0114169 | A1* | 8/2002 | Harada | F21V 3/04 362/558 |
| 2003/0099039 | A1* | 5/2003 | Kashima | G02B 5/021 359/599 |
| 2008/0024870 | A1 | 1/2008 | Bourdelais et al. | |
| 2008/0062720 | A1* | 3/2008 | Chung | G02B 6/0051 362/620 |
| 2009/0296028 | A1* | 12/2009 | Lee | G02B 5/021 349/96 |
| 2010/0136287 | A1 | 6/2010 | Kato et al. | |
| 2010/0165466 | A1* | 7/2010 | Endo | B32B 7/14 359/599 |
| 2012/0300428 | A1 | 11/2012 | Cheng et al. | |
| 2013/0121018 | A1* | 5/2013 | Sasaki | G02B 5/02 362/602 |
| 2015/0098210 | A1 | 4/2015 | Arakawa | |

FOREIGN PATENT DOCUMENTS

| JP | 2005-77448 A | 3/2005 |
|---|---|---|
| KR | 10-1441714 A | 9/2014 |
| KR | 10-2015-0039697 A | 4/2015 |
| TW | 201248264 A | 12/2012 |

* cited by examiner

*Primary Examiner* — Jong-Suk (James) Lee
*Assistant Examiner* — Eric T Eide
(74) *Attorney, Agent, or Firm* — Norris McLaughlin, P.A.

(57) ABSTRACT

A light diffusion sheet for overlaying is to be provided on a front face side of a prism sheet in a backlight unit of a liquid crystal display device, and has a substrate layer and a light diffusion layer overlaid on a front face side of the substrate layer, in which the light diffusion layer contains a resin matrix and resin beads dispersed in the resin matrix, wherein: a mode diameter in a volume-weighted particle size distribution of the resin beads is no less than 2.5 μm and no greater than 5.5 μm; a density of the resin beads per unit area is no less than 9,000 beads/mm² and no greater than 24,000 beads/mm²; and an average thickness of the light diffusion layer is no less than 2 μm and no greater than 9 μm.

9 Claims, 4 Drawing Sheets

LIGHT DIFFUSION SHEET FOR OVERLAYING, AND BACKLIGHT UNIT

BACKGROUND OF THE INVENTION

Field of the Invention

The present invention relates to a light diffusion sheet for overlaying, and a backlight unit.

Discussion of the Background

Liquid crystal display devices are intensively used as flat panel displays taking advantages of characteristic features such as thin modeling, weight saving and low electric power consumption, and use thereof has been increasing over time, such as televisions, personal computers, mobile phone terminals such as smartphones, portable information terminals such as tablet terminals, and the like.

Figure 5:
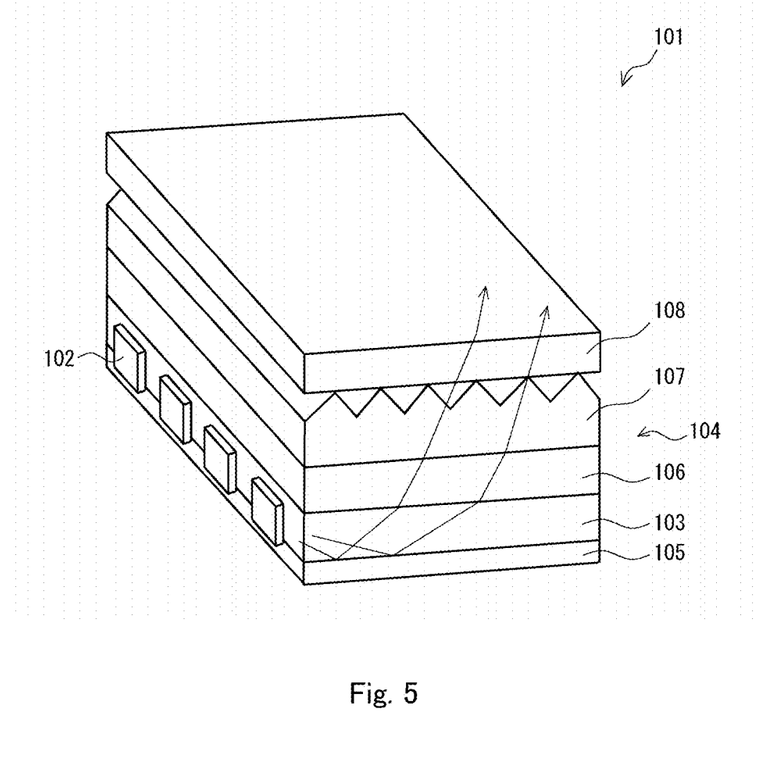
FIG. 5 shows a schematic perspective view illustrating a conventional edge-lit backlight unit.

As such liquid crystal display devices, those of a backlight system in which a liquid crystal panel is irradiated from the back face side are in widespread use, which are equipped with a backlight unit of an edge-lit type (side-lit type), an immediate beneath type or the like. The edge-lit backlight unit 101 provided in such a liquid crystal display device include, as shown in FIG. 5 in general: a light source 102; a rectangular plate-shaped optical waveguide plate 103 disposed to be aligned with the light source 102 along the ends thereof; a plurality of optical sheets 104 provided to overlay the front face side of the optical waveguide plate 103; and a reflection sheet 105 provided on a back face side of the optical waveguide plate 103. The optical waveguide plate 103 is generally made from a synthetic resin, in which a polycarbonate, acrylic resin or the like is used as a principal component. As the light source 102, LED (light emitting diode), a cold-cathode tube or the like is used, and in light of reduction in size, energy saving and the like, LED is in widespread use for the present. In addition, the optical sheet 104 which may be used includes: (1) a light diffusion sheet for underlaying 106 superposed on a front face side of the optical waveguide plate 103, and predominantly has a light diffusion function; (2) a prism sheet 107 superposed on a front face side of the light diffusion sheet for underlaying 106, and has a refracting function toward a normal direction side; and (3) a light diffusion sheet for overlaying 108, superposed on a front face side of the prism sheet 107, and inhibits lack in uniformity of the luminance resulting from the shape and the like of prism portions of the prism sheet 107 through slightly diffusing the rays of light (see Japanese Unexamined Patent Application, Publication No. 2005-77448). In addition, generally used light diffusion sheets for overlaying are provided with a substrate layer, and a light diffusion layer that is overlaid on the front face side of the substrate layer and has a resin matrix and resin beads.

PRIOR ART DOCUMENTS

Patent Documents

Patent Document 1: Japanese Unexamined Patent Application, Publication No. 2005-77448

SUMMARY OF THE INVENTION

Problems to be Solved by the Invention

However, it is proven that when such a conventional light diffusion sheet for overlaying is used in liquid crystal display devices in which a significant decrease of the pixel pitch of the liquid crystal panel is promoted, a sparkle (may be also referred to as "glare", "roughness", "shimmering (unevenness like leaf-shaded/filtered sunlight; referred to as SASAMURA in Japanese)", "moire", "interference of light", "unevenness" or "bright spot") resulting from the interference with the pixel pitch of the liquid crystal panel provided on the front face side of the light diffusion sheet for overlaying is generated. In addition, thorough investigation by the present inventor has revealed that the sparkle can be reduced by decreasing the particle size of resin beads in the light diffusion layer of the light diffusion sheet for overlaying such that irregularities on the surface of the light diffusion layer become minute.

The present invention was made in view of the foregoing circumstances, and an object of the invention is to provide a light diffusion sheet for overlaying, and a backlight unit that are each capable of inhibiting the generation of a sparkle resulting from the interference with the pixel pitch of a liquid crystal panel, while lack in uniformity of the luminance resulting from the shape and the like of prism portions of a prism sheet provided on a back face side is inhibited.

Means for Solving the Problems

The light diffusion sheet for overlaying according to an aspect of the present invention made for solving the aforementioned problems is a light diffusion sheet for overlaying to be provided on a front face side of a prism sheet in a backlight unit of a liquid crystal display device, the light diffusion sheet comprising a substrate layer, and a light diffusion layer overlaid on a front face side of the substrate layer, characterized in that: the light diffusion layer has a resin matrix, and resin beads dispersed in the resin matrix; a mode diameter in a volume-weighted particle size distribution of the resin beads is no less than 2.5 µm and no greater than 5.5 µm; a density of the resin beads per unit area is no less than 9,000 beads/mm$^2$ and no greater than 24,000 beads/mm$^2$; and an average thickness of the light diffusion layer is no less than 2 µm and no greater than 9 µm.

Due to the light diffusion layer having the resin matrix and the resin beads, irregularities resulting from the resin beads are formed on the front face of the light diffusion layer in the light diffusion sheet for overlaying. Therefore, the light diffusion sheet for overlaying enables lack in uniformity of the luminance resulting from a shape and the like of protruding prism portions of a prism sheet to be inhibited by allowing rays of light having entered from the back face side to be diffused by means of the irregularities. In addition, the light diffusion sheet for overlaying is capable of inhibiting the generation of a sparkle resulting from the interference with a pixel pitch of the liquid crystal panel since formation of fine and highly dense irregularities is enabled at random due to the mode diameter in a volume-weighted particle size distribution of the resin beads, density of the resin beads per unit area, and the average thickness of the light diffusion layer falling within the above range.

The coefficient of variation of the particle size in the volume-weighted particle size distribution of the resin beads is preferably no greater than 42%. In the case in which the coefficient of variation of the particle size in the volume-weighted particle size distribution of the resin beads is no greater than the upper limit, fine and highly dense irregularities can be easily formed on the front face of the light diffusion layer, whereby generation of the sparkle resulting from the interference with a pixel pitch of the liquid crystal panel can be more accurately inhibited.

The particle size amplitude in the volume-weighted particle size distribution of the resin beads is preferably no less than 13 μm and no greater than 20 μm. When the particle size amplitude in the volume-weighted particle size distribution of the resin beads is as described above, fine and highly dense irregularities can be easily formed on the front face of the light diffusion layer, and the generation of the sparkle resulting from the interference with a pixel pitch of the liquid crystal panel can be more accurately inhibited.

An average particle diameter D50 on the volume-weighted particle size distribution of the resin beads is preferably no greater than 5.7 μm. When the average particle diameter D50 on the volume-weighted particle size distribution of the resin beads is no greater than the upper limit, generation of a sparkle resulting from the interference with a pixel pitch of the liquid crystal panel can be inhibited by means of a large number of resin beads having a small particle size, whereas sticking with the liquid crystal panel can be prevented by a small number of the resin beads having a comparatively large particle size.

The arithmetic average roughness Ra of a front face of the light diffusion layer is preferably no less than 0.3 μm and no greater than 1 μm. When the arithmetic average roughness Ra of a front face of the light diffusion layer thus falls within the above range, the generation of the sparkle resulting from the interference with a pixel pitch of the liquid crystal panel can be more accurately inhibited.

The ten-point mean roughness Rz of a front face of the light diffusion layer is preferably no less than 1.5 μm and no greater than 4.5 μm, and the average length RSm of a roughness curve element is preferably no less than 30 μm and no greater than 100 μm. When the ten-point mean roughness Rz of a front face of the light diffusion layer and average length RSm of a roughness curve element falls within the above range, the generation of the sparkle resulting from the interference with a pixel pitch of the liquid crystal panel can be more accurately inhibited.

It is preferred that the resin beads in the light diffusion layer are substantially spaced away from a substrate layer surface. When the resin beads in the light diffusion layer are thus substantially spaced away from a substrate layer surface, fine and highly dense irregularities can be easily formed on the front face of the light diffusion layer in the case of the mode diameter in a volume-weighted particle size distribution of the resin beads, the density of the resin beads per unit area, and the average thickness of the light diffusion layer falling within the above range, whereby generation of the sparkle resulting from the interference with a pixel pitch of the liquid crystal panel can be more accurately inhibited.

In addition, the backlight unit according to another aspect of the present invention made for solving the aforementioned problems is for use in a liquid crystal display device, and comprises: an optical waveguide sheet for guiding rays of light that enter from an end face to a front face side; a light source for allowing an end face of the optical waveguide sheet to be irradiated with rays of light; a light diffusion sheet for underlaying that is superposed on a front face side of the optical waveguide sheet; a prism sheet provided on a front face side of the light diffusion sheet for underlaying; and a light diffusion sheet for overlaying that is superposed on a front face side of the prism sheet, wherein as the light diffusion sheet for overlaying, the aforementioned light diffusion sheet for overlaying is used.

In the backlight unit, since the light diffusion sheet for overlaying is superposed on a front face side of a prism sheet, lack in uniformity of the luminance resulting from the shape and the like of the prism portions of the prism sheet can be inhibited by allowing rays of light that exit from the prism sheet to be diffused by means of the irregularities formed on the front face of the light diffusion layer of the light diffusion sheet for overlaying. In addition, the backlight unit is capable of inhibiting the generation of a sparkle resulting from the interference with a pixel pitch of the liquid crystal panel since formation of the fine and highly dense irregularities is enabled at random due to the mode diameter in a volume-weighted particle size distribution of the resin beads, the density of the resin beads per unit area, and the average thickness of the light diffusion layer in the light diffusion sheet for overlaying falling within the above range.

A ratio of the average particle diameter D50 of the resin beads to an average pitch of ridgelines on the prism sheet is preferably no less than 0.06 and no greater than 0.25. When the ratio of average particle diameter D50 of the resin beads to an average pitch of ridgelines on the prism sheet falls within the above range, the rays of light that exit from the prism sheet can be adequately diffused by the light diffusion sheet for overlaying, and thus lack in uniformity of the luminance resulting from the shape and the like of the prism portions of the prism sheet can be more accurately inhibited.

It is to be noted that as referred to herein the term "front face side" means the side of a viewer for the liquid crystal display device, whereas the term "back face side" means the reverse side. The expression "mode diameter in a volume-weighted particle size distribution" as referred to means a mode diameter calculated from a cumulative distribution as determined by a laser diffraction method. The expression "density of resin beads per unit area" as referred to means a value derived by averaging densities of the resin beads per unit area (beads/mm$^2$) measured from laser images at arbitrary ten places obtained by scanning a surface shape of from protruding parts to recessed parts of fine irregularities formed on a front face of the light diffusion layer through irradiating from the front face of the light diffusion layer side with a laser beam. The expression "average thickness of a light diffusion layer" as referred to means an average thickness between an average interface of the front face of the light diffusion layer and an average interface of the back face of the light diffusion layer. The "average particle diameter on a volume-weighted particle size distribution" as referred to means an average particle diameter calculated from a cumulative distribution as determined by a laser diffraction method. The expressions "arithmetic average roughness Ra" and "average length RSm of a roughness curve element" as referred to each mean a value obtained in accordance with JIS-B0601: 2001, with a cut-off λc of 2.5 mm and an evaluation length of 12.5 mm. The expression "ten-point mean roughness Rz" as referred to means a value obtained in accordance with JIS-B0601: 1994, with a cut-off λc of 2.5 mm and an evaluation length of 12.5 mm. The expression "resin beads are (being) substantially spaced away from a substrate layer surface" as referred to means that no less than 50% resin beads are spaced away from the substrate layer surface, with preferably no less than 60% resin beads and more preferably no less than 70% resin beads being spaced away from the substrate layer surface.

Effects of the Invention

As explained in the foregoing, the light diffusion sheet for overlaying and the backlight unit of the aspects of the present invention is capable of inhibiting the generation of a sparkle resulting from the interference with a pixel pitch of the liquid crystal panel, while lack in uniformity of the luminance resulting from the shape and the like of the prism portions of the prism sheet is inhibited.

DESCRIPTION OF EMBODIMENTS

Hereinafter, embodiments of the present invention are described in detail with appropriate references to the drawings.

Backlight Unit

Figure 1:
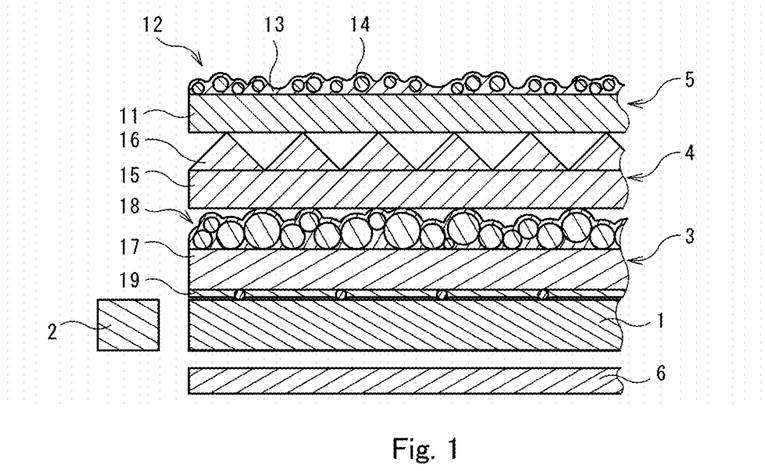
FIG. 1 shows a schematic cross sectional view illustrating a backlight unit according to an embodiment of the present invention.
Figure 2:
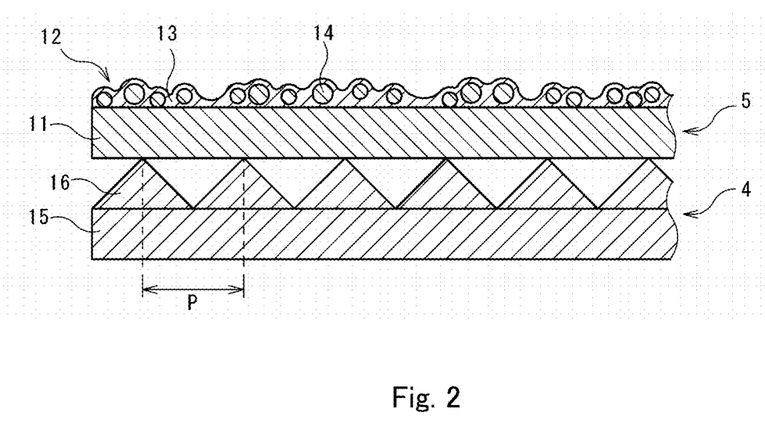
FIG. 2 shows a schematic cross sectional view illustrating a state of providing the light diffusion sheet for overlaying and prism sheet in the backlight unit shown in FIG. 1.

The backlight unit of a liquid crystal display device shown in FIG. 1 comprises a prism sheet 4, and a light diffusion sheet for overlaying 5 provided on the front face side of the prism sheet 4. The backlight unit is an edge-lit backlight unit, and comprises: an optical waveguide sheet 1 for guiding rays of light that enter from an end face to the front face side; a light source 2 for allowing the end face of the optical waveguide sheet 1 to be irradiated with the rays of light; a light diffusion sheet for underlaying 3 that is superposed on the front face side of the optical waveguide sheet 1; the prism sheet 4 povided on the front face side of the light diffusion sheet for underlaying 3; and the light diffusion sheet for overlaying 5 superposed on the front face side of the prism sheet 4. In addition, the backlight unit further comprises a reflection sheet 6 provided on the back face side of the optical waveguide sheet 1. The light diffusion sheet for underlaying 3 allows the rays of light that enter from the back face side to be condensed, to a normal direction side while permitting light diffusion (allowing for light condensing diffusion). The prism sheet 4 reflects the rays of light that enter from the back face side, toward a normal direction side. The light diffusion sheet for overlaying 5 allows the rays of light that enter from the back face side to be diffused to some extent, thereby inhibiting lack in uniformity of the luminance resulting from the shape and the like of prism portions of the prism sheet 4, and inhibiting generation of a sparkle resulting from the interference with the pixel pitch of a liquid crystal panel (not shown in the Figure) provided on the front face side of the light diffusion sheet for overlaying 5. The reflection sheet 6 reflects the rays of light that exit from the back face side of the optical waveguide sheet 1 to the front face side, and thus the rays of light again enter the optical waveguide sheet 1.

Light Diffusion Sheet for Overlaying light diffusion sheet for overlaying 5 is provided on the front face side of the prism sheet 4 in the backlight unit of a liquid crystal display device. In this embodiment, the light diffusion sheet for overlaying 5 is directly superposed, i.e., without any other sheet, etc., being interposed, on the front face of the prism sheet 4 in particular. The light diffusion sheet for overlaying 5 comprises a substrate layer 11, and a light diffusion layer 12 overlaid on the front face side of the substrate layer 11. The light diffusion sheet for overlaying 5 is constituted as a two-layer structure that includes the substrate layer 11 and the light diffusion layer 12 overlaid directly on the front face of the substrate layer 11.

Substrate Layer

Due to a feature of transmission of rays of light required for the substrate layer 11, a transparent, particularly colorless transparent, synthetic resin is used as a principal component for forming the substrate layer 11. The principal component of the substrate layer 11 is not particularly limited, and is exemplified by polyethylene terephthalate, polyethylene naphthalate, an acrylic resin, a polycarbonate, a polystyrene, a polyolefin, cellulose acetate, weather resistant vinyl chloride and the like. Of these, polyethylene terephthalate that is superior in transparency and has favorable strength is preferred, and polyethylene terephthalate having improved deflection performance is particularly preferred. It is to be noted that the "principal component" as referred to means a component the content of which is highest, and for example, a component the content of which is no less than 50% by mass.

The lower limit of the average thickness of the substrate layer 11 is preferably 10 µm, more preferably 35 µm, and still more preferably 50 µm. On the other hand, the upper limit of the average thickness of the substrate layer 11 is preferably 500 µm, more preferably 250 µm, and still more preferably 188 µm. When the average thickness of the substrate layer 11 is less than the lower limit, curling may occur in the case of forming the light diffusion layer 12 by coating. To the contrary, when the average thickness of the substrate layer 11 is greater than the upper limit, the luminance of the liquid crystal display device may be impaired, and the demands for reduction in thickness of the liquid crystal display device may not be satisfied. It is to be noted that the "average thickness" as referred to means an averaged value from arbitrary ten points.

Light Diffusion Layer

The light diffusion layer 12 constitutes the outermost surface of the light diffusion sheet for overlaying 5. The light diffusion layer 12 includes a resin matrix 13, and resin beads 14 dispersed in the resin matrix 13. The light diffusion layer 12 contains the resin beads 14 being dispersed with a substantially equal density. The resin beads 14 are surrounded by the resin matrix 13. The light diffusion layer 12 allows the rays of light to be diffused outward by means of fine irregularities formed on the front face.

The lower limit of the average thickness of the light diffusion layer 12 is 2 µm, and more preferably 3 µm. On the other hand, the upper limit of the average thickness of the light diffusion layer 12 is 9 µm, more preferably 7 µm, and still more preferably 5 µm. When the average thickness of the light diffusion layer 12 is less than the lower limit, it may be impossible to accurately fix the resin beads 14 by the resin matrix 13, and thus the resin beads 14 may be detached from the light diffusion layer 12. To the contrary, when the average thickness of the light diffusion layer 12 is greater than the upper limit, it may be difficult to form the fine and highly dense irregularities on the front face of the light diffusion layer 12, and consequently it may be impossible to sufficiently inhibit the generation of the sparkle resulting from the interference with a pixel pitch of the liquid crystal panel provided on the front face side of the light diffusion sheet for overlaying 5.

Due to a feature of transmission of rays of light required for the resin matrix 13, a transparent, particularly colorless transparent, synthetic resin is used as a principal component for forming the resin matrix 13. The synthetic resin is exemplified by a thermally curable resin and an active energy ray-curable resin. Of these, the synthetic resin is preferably an active energy ray-curable resin which is more likely to retain the resin beads 14 in a state of being spaced away from the surface of the substrate layer 11 as described later.

The thermally curable resin is exemplified by an epoxy resin, a silicone resin, a phenol resin, a urea resin, an unsaturated polyester resin, a melamine resin, an alkyd resin, a polyimide resin, an acrylic resin, an amide functional copolymer, a urethane resin, and the like.

The active energy ray-curable resin is exemplified by a ultraviolet ray-curable resin that is crosslinked and hardened by the irradiation with an ultraviolet ray, an electron beam-curable resin that is crosslinked and hardened by the irradiation with an electron beam, and the like, which may be appropriately selected for use from among polymerizable monomers and polymerizable oligomers. Of these, the active energy ray-curable resin is preferably an acrylic, urethane-based or acrylic urethane-based ultraviolet ray-curable resin that is capable of improving the adhesiveness with the substrate layer 11, and can readily inhibit detachment of the resin beads 14 from the light diffusion layer 12.

As the polymerizable monomer, a (meth)acrylate monomer having an unsaturated radical-polymerizable group in the molecule may be suitably used, and in particular, a polyfunctional (meth)acrylate is preferred. The polyfunctional (meth)acrylate is not particularly limited as long as it is a (meth)acrylate having at least two ethylenic unsaturated bonds in its molecule. Specifically, ethylene glycol di(meth)acrylate, propylene glycol di(meth)acrylate, 1,4-butanediol di(meth)acrylate, 1,6-hexanediol di(meth)acrylate, neopentyl glycol di(meth)acrylate, polyethylene glycol di(meth)acrylate, hydroxypivalate neopentylglycol di(meth)acrylate, dicyclopentanyl di(meth)acrylate, caprolactone modified dicyclopentenyl di(meth)acrylate, ethylene oxide modified phosphate di(meth)acrylate, allylated cyclohexyl di(meth)acrylate, isocyanurate di(meth)acrylate, trimethylolpropane tri(meth)acrylate, ethylene oxide modified trimethylolpropane tri(meth)acrylate, dipentaerythritol tri(meth)acrylate, propionic acid modified dipentaerythritol tri(meth)acrylate, pentaerythritol tri(meth)acrylate, propylene oxide modified trimethylolpropane tri(meth)acrylate, tris(acryloxyethyl)isocyanurate, propionic acid modified dipentaerythritol penta(meth)acrylate, dipentaerythritol hexa(meth)acrylate, ethylene oxide modified dipentaerythritol hexa(meth)acrylate, caprolactone modified dipentaerythritol hexa(meth)acrylate, and the like are exemplified. These polyfunctional (meth)acrylates may be used alone, or in combination of two or more thereof. Of these, dipentaerythritol tri(meth)acrylate is preferred.

Furthermore, in addition to the polyfunctional (meth)acrylate, a monofunctional (meth)acrylate may be further included for the purpose of e.g., decreasing the viscosity. Examples of the monofunctional (meth)acrylate include methyl (meth)acrylate, ethyl (meth)acrylate, propyl (meth)acrylate, butyl (meth)acrylate, pentyl (meth)acrylate, hexyl (meth)acrylate, cyclohexyl (meth)acrylate, 2-ethylhexyl (meth)acrylate, lauryl (meth)acrylate, stearyl (meth)acrylate, isobornyl (meth)acrylate, and the like. These monofunctional (meth)acrylates may be used alone, or in combination of two or more thereof.

As the polymerizable oligomer, an oligomer having a radical polymerizable unsaturated group in its molecule is exemplified, and for example, an epoxy (meth)acrylate oligomer, a urethane (meth)acrylate oligomer, a polyester (meth)acrylate oligomer, a polyether (meth)acrylate oligomer and the like may be included.

The epoxy (meth)acrylate oligomer may be obtained by reacting, for example, an oxirane ring of a bisphenol epoxy resin or novolac epoxy resin having a comparatively low molecular weight with a (meth)acrylic acid to permit esterification. Alternatively, a carboxyl modified epoxy (meth)acrylate oligomer may be also used which is obtained by partially modifying the epoxy (meth)acrylate oligomer with a dibasic carboxylic anhydride. The urethane (meth)acrylate oligomer may be obtained by, for example, esterifying with a (meth)acrylic acid, a polyurethane oligomer obtained by a reaction of a polyether polyol and/or a polyester polyol with a polyisocyanate. The polyester (meth)acrylate oligomer may be obtained by, for example, esterifying with a (meth)acrylic acid, hydroxyl groups of a polyester oligomer having hydroxyl groups at both two ends obtained by condensation of a polyhydric carboxylic acid with a polyhydric alcohol. Alternatively, it is also possible to obtain the polyester (meth)acrylate oligomer by esterifying with a (meth)acrylic acid, hydroxyl groups at ends of an oligomer obtained by allowing an alkylene oxide to react with a polyhydric carboxylic acid. The polyether (meth)acrylate oligomer may be obtained by esterifying with a (meth)acrylic acid, hydroxyl groups of a polyether polyol.

Also, as the active energy ray-curable resin, an ultraviolet ray-curable epoxy resin may be suitably used. The ultraviolet ray-curable epoxy resin is exemplified by cured products of a bisphenol A epoxy resin, a glycidyl ether epoxy resin or the like. Owing to the resin matrix 13 including the ultraviolet ray-curable epoxy resin as a principal component, the light diffusion sheet for overlaying 5 can readily form the irregularities with a desired shape on the front face side of the substrate layer while volumetric shrinkage is suppressed during the curing. In addition, due to the resin matrix 13 including the ultraviolet ray-curable epoxy resin as a principal component, the light diffusion sheet for overlaying 5 can improve the flexibility of the resin matrix 13, whereby a scratch preventive property of the light diffusion sheet for overlaying 5 on the liquid crystal panel, etc., provided on the front face thereof. Furthermore, when the ultraviolet ray-curable epoxy resin is used as the active energy ray-curable resin, it is preferred that other polymerizable monomer and polymerizable oligomer such as the (meth)acrylate monomer and (meth)acrylate oligomer are not contained. Accordingly, the flexibility of the resin matrix 13 is further increased, whereby the scratch preventive property can be further improved.

When the ultraviolet ray-curable resin is used as the active energy ray-curable resin, it is desired that an initiator for photopolymerization is added in an amount of about no less than 0.1 parts by mass and no greater than 5 parts by mass with respect to 100 parts by mass of the resin. The initiator for photopolymerization is not particularly limited, and for the polymerizable monomer and/or the polymerizable oligomer having a radical polymerizable unsaturated group in its molecule, examples of the initiator include benzophenone, benzyl, Michler's ketone, 2-chlorothioxanthone, 2,4-diethylthioxanthone, benzoin ethyl ether, benzoin isopropyl ether, benzoin isobutyl ether, 2,2-diethoxyacetophenone, benzyl dimethyl ketal, 2,2-dimethoxy-1,2-diphenylethan-1- one, 2-hydroxy-2-methyl-1-phenylpropane-1-one, 1-hydroxycyclohexyl phenyl ketone, 2-methyl-1-[4-(methylthio)phenyl]-2-morpholinopropanone-1,1-[4-(2-hydroxyethoxy)-phenyl]-2-hydroxy-2-methyl-1-propan-1-one, bis(cyclopentadienyl)-bis[2,6-difluoro-3-(pyrrol-1-yl) phenyl] titanium, 2-benzyl-2-dimethylamino-1-(4-morpholinophenyl)-butanone-1, 2,4,6-trimethylbenzoyldiphenyl phosphine oxide, and the like. Moreover, for the polymerizable oligomer having a cation polymerizable functional group in its molecule, etc., examples of the initiator include aromatic sulfonium salts, aromatic diazonium salts, aromatic iodonium salts, metallocene compounds, benzoinsulfonic acid esters, and the like. It is to be noted that these compounds may be used each alone, or as a mixture of a plurality of the compounds.

It is to be noted that the resin matrix 13 may contain other additive in addition to the synthetic resin described above. The additive is exemplified by a silicone-based additive, a fluorine-based additive, an antistatic agent, and the like. Moreover, the content of the additive with respect to 100 parts by mass of the synthetic resin component in the resin matrix 13 in terms of the solid content be no less than 0.05 parts by mass and no greater than 5 parts by mass, for example.

The resin beads 14 are resin particles having a property of transmitting and diffusing rays of light. The resin beads 14 are formed by using a transparent, particularly colorless transparent synthetic resin as a principal component. The principal component of the resin beads 14 is exemplified by an acrylic resin, an acrylonitrile resin, polyurethane, polyvinyl chloride, polystyrene, polyamide, polyacrylonitrile, and the like. Of these, an acrylic resin that is highly transparent is preferred, and polymethylmethacrylate (PMMA) is particularly preferred.

The shape of the resin beads 14 is not particularly limited, and may be for example, spherical, cubic, needle-like, rod-like, spindle, platy, flaky, fibrous or the like, and of these, the shape is preferably spherical having superior light diffusibility.

The resin beads 14 in the light diffusion layer 12 may be in contact with the surface of the substrate layer 11; however, it is preferred that the resin beads 14 are substantially spaced away from the substrate layer 11. In the light diffusion sheet for overlaying 5, for example, by using as the principal component of the resin matrix 13, the active energy ray-curable resin, which is applied on the front face of the substrate layer 11 after preparing a coating liquid containing the resin beads 14 dispersed in the active energy ray-curable resin, and then allowing the active energy ray-curable resin to be hardened in a state in which the resin beads 14 are spaced away from the surface of the substrate layer 11, whereby the resin beads 14 can be fixed in the state being spaced away from the surface of the substrate layer 11. Due to the resin beads 14 being substantially spaced away from the surface of the substrate layer 11, fine and highly dense irregularities can be easily formed on the front face of the light diffusion layer 12 according to the light diffusion sheet for overlaying 5, and the generation of the sparkle resulting from the interference with a pixel pitch of the liquid crystal panel can be more accurately inhibited. It is to be noted that the expression "resin beads are (being) spaced away from the substrate layer surface" as referred to indicates a conception in which other resin beads being in contact the resin beads that are in contact with the surface of the substrate layer but not being in direct contact with the surface of the substrate layer are also included. In addition, as to whether or not the resin beads are spaced away from the surface of the substrate layer can be ascertained by observing the cross section along the thickness direction of the light diffusion sheet for overlaying with a laser microscope, for example.

The lower limit of the mode diameter in the volume-weighted particle size distribution of the resin beads 14 is 2.5 µm, preferably 4.5 µm, more preferably 4.7 µm, and still more preferably 4.9 µm. On the other hand, the upper limit of the mode diameter of the resin beads 14 is 5.5 µm, preferably 5.4 µm, and more preferably 5.3 µm. When the mode diameter of the resin beads 14 is less than the lower limit, the irregularities on the front face of the light diffusion layer 12 are so small that the light diffusibility may be insufficient, whereby it may be impossible to sufficiently inhibit lack in uniformity of the luminance resulting from the shape and the like of the prism portions of the prism sheet 4, and the generation of the sparkle resulting from the interference with a pixel pitch of the liquid crystal panel. To the contrary, when the mode diameter of the resin beads 14 is greater than the upper limit, comparatively large irregularities are formed on the front face of the light diffusion layer 12 in a too large number, and thus it may be impossible to sufficiently inhibit the generation of the sparkle resulting from the interference with a pixel pitch of the liquid crystal panel.

The lower limit of the density of the resin beads 14 per unit area is 9,000 beads/mm$^2$, more preferably 11,500 beads/mm$^2$, and still more preferably 14,000 beads/mm$^2$. On the other hand, the upper limit of the density of the resin beads 14 per unit area is 24,000 beads/mm$^2$, more preferably 21,000 beads/mm$^2$, and still more preferably 20,000 beads/mm$^2$. When the density of the resin beads 14 per unit area is less than the lower limit, it may be impossible to sufficiently inhibit the lack in uniformity of the luminance resulting from a shape and the like of protruding prism portions of the prism sheet 4, and densification of the irregularities on the front face of the light diffusion layer 12 may be insufficient, whereby it may be impossible to sufficiently inhibit the generation of the sparkle resulting from the interference with a pixel pitch of the liquid crystal panel. To the contrary, when the density of the resin beads 14 per unit area is greater than the upper limit, rays of light that enter from the back face side are diffused beyond necessity, the luminance of the liquid crystal display device may be lowered.

The upper limit of the coefficient of variation of the particle size in the volume-weighted particle size distribution of the resin beads 14 is preferably 42%, more preferably 41%, still more preferably 40%, and particularly preferably 39%. When the coefficient of variation is greater than the upper limit, comparatively large irregularities are formed on the front face of the light diffusion layer 12 in a too large number, and thus it may be impossible to sufficiently inhibit the generation of the sparkle resulting from the interference with a pixel pitch of the liquid crystal panel. On the other hand, the lower limit of the coefficient of variation is preferably 30%, and more preferably 35%. When the coefficient of variation is less than the lower limit, the irregularities on the front face of the light diffusion layer 12 are too much uniformized, and thus it may be impossible to suitably diffuse the rays of light.

The lower limit of the particle size amplitude in the volume-weighted particle size distribution of the resin beads 14 is preferably 13 µm, more preferably 14 µm, and still more preferably 15 µm. On the other hand, the upper limit of the particle size amplitude of the resin beads 14 is preferably 20 µm, more preferably 19 µm, and still more preferably 18 µm. When the particle size amplitude of the resin beads 14 is less than the lower limit, the irregularities on the front face of the light diffusion layer 12 are too much uniformized, and thus it may be impossible to suitably diffuse the rays of light. To the contrary, when the particle size amplitude of the resin beads 14 is greater than the upper limit, comparatively large irregularities are formed on the front face of the light diffusion layer 12 in a too large number, and thus it may be impossible to sufficiently inhibit the generation of the sparkle resulting from the interference with a pixel pitch of the liquid crystal panel. It is to be noted that the expression "particle size amplitude in the volume-weighted particle size distribution of resin beads" may be determined by subtracting the minimum diameter from the maximum diameter for the particle size in the volume-weighted particle size distribution of resin beads.

The upper limit of the average particle diameter D50 on the volume-weighted particle size distribution of the resin beads 14 is preferably 5.7 µm, more preferably 5.5 µm, and still more preferably 5 µm. On the other hand, the lower limit of the average particle diameter D50 on the volume-weighted particle size distribution of the resin beads 14 is preferably 4 µm, more preferably 4.3 µm, and still more preferably 4.5 µm. When the average particle diameter D50 is greater than the upper limit, comparatively large irregularities are formed on the front face of the light diffusion layer 12 in a too large number, and thus it may be impossible to sufficiently inhibit the generation of the sparkle resulting from the interference with a pixel pitch of the liquid crystal panel. To the contrary, when the average particle diameter D50 is less than the lower limit, the irregularities on the front face of the light diffusion layer 12 are so small that the light diffusibility may be insufficient, whereby it may be impossible to sufficiently inhibit the lack in uniformity of the luminance resulting from the shape and the like of the prism portions of the prism sheet 4.

The upper limit of the particle diameter D70 on the volume-weighted particle size distribution of the resin beads 14 is preferably 6.4 µm, more preferably 6.2 µm, and still more preferably 5.9 µm. On the other hand, the lower limit of the particle diameter D70 on the volume-weighted particle size distribution of the resin beads 14 is preferably 5.1 µm, more preferably 5.3 µm, and still more preferably 5.4 µm. When the particle diameter D70 on the volume-weighted particle size distribution of the resin beads 14 is greater than the upper limit, comparatively large irregularities are formed on the front face of the light diffusion layer 12 in a too large number, and thus it may be impossible to sufficiently inhibit the generation of the sparkle resulting from the interference with a pixel pitch of the liquid crystal panel. To the contrary, when the particle diameter D70 on the volume-weighted particle size distribution of the resin beads 14 is less than the lower limit, the irregularities on the front face of the light diffusion layer 12 are so small that the light diffusibility may be insufficient, whereby it may be impossible to sufficiently inhibit the lack in uniformity of the luminance resulting from the shape and the like of the prism portions of the prism sheet 4.

The lower limit of the refractive index of the resin beads 14 is preferably 1.46, and more preferably 1.48. On the other hand, the upper limit of the refractive index of the resin beads 14 is preferably 1.60, and more preferably 1.59. When the refractive index of the resin beads 14 thus falls within the above range, the difference in the refractive index from the resin matrix 13 can be appropriately adjusted, and accordingly, lack in uniformity of the luminance resulting from the shape and the like of protruding prism portions 16 of the prism sheet 4 can be readily inhibited as described later. It is to be noted that the "refractive index" as referred to means a refractive index for light with a wavelength of 589.3 nm (sodium D ray).

The lower limit of the arithmetic average roughness Ra of the front face of the light diffusion layer 12 is preferably 0.3 µm, more preferably 0.4 µm, and still more preferably 0.5 µm. On the other hand, the upper limit of the arithmetic average roughness Ra of the front face of the light diffusion layer 12 is preferably 1 µm, more preferably 0.9 µm, and still more preferably 0.8 µm. When the arithmetic average roughness Ra of the front face of the light diffusion layer 12 is less than the lower limit, the irregularities on the front face of the light diffusion layer 12 are so small that the light diffusibility may be insufficient, whereby it may be impossible to sufficiently inhibit the lack in uniformity of the luminance resulting from the shape and the like of protruding prism portions of the prism sheet 4. To the contrary, when the arithmetic average roughness Ra of the front face of the light diffusion layer 12 is greater than the upper limit, comparatively large irregularities are formed on the front face of the light diffusion layer 12 in a too large number, and thus it may be impossible to sufficiently inhibit the generation of the sparkle resulting from the interference with a pixel pitch of the liquid crystal panel.

The lower limit of the ten-point mean roughness Rz of the front face of the light diffusion layer 12 is preferably 1.5 µm, more preferably 2 µm, and still more preferably 2.5 µm. On the other hand, the upper limit of the ten-point mean roughness Rz of the front face of the light diffusion layer 12 is preferably 4.5 µm, more preferably 4 µm, and still more preferably 3.6 µm. When the ten-point mean roughness Rz of the front face of the light diffusion layer 12 is less than the lower limit, the irregularities on the front face of the light diffusion layer 12 are so small that the light diffusibility may be insufficient, whereby it may be impossible to sufficiently inhibit the lack in uniformity of the luminance resulting from the shape and the like of protruding prism portions of the prism sheet 4. To the contrary, when the ten-point mean roughness Rz of the front face of the light diffusion layer 12 is greater than the upper limit, comparatively large irregularities are formed on the front face of the light diffusion layer 12 in a too large number, and thus it may be impossible to sufficiently inhibit the generation of the sparkle resulting from the interference with a pixel pitch of the liquid crystal panel.

The lower limit of the root mean square roughness Rq or the front face of the light diffusion layer 12 is preferably 0.55 µm, more preferably 0.65 µm, and still more preferably 0.7 µm. On the other hand, the upper limit of the root mean square roughness Rq of the front face of the light diffusion layer 12 is preferably 0.9 µm, more preferably 0.85 µm, and still more preferably 0.8 µm. When the root mean square roughness Rq of the front face of the light diffusion layer 12 is less than the lower limit, the irregularities on the front face of the light diffusion layer 12 are so small that the light diffusibility may be insufficient, whereby it may be impossible to sufficiently inhibit the lack in uniformity of the luminance resulting from the shape and the like of protruding prism portions of the prism sheet 4. To the contrary, when the root mean square roughness Rq of the front face of the light diffusion layer 12 is greater than the upper limit, comparatively large irregularities are formed on the front face of the light diffusion layer 12 in a too large number, and thus it may be impossible to sufficiently inhibit the generation of the sparkle resulting from the interference with a pixel pitch of the liquid crystal panel. It is to be noted that the "root mean square roughness Rq" as referred to means a value determined in accordance with JIS-B0601: 2001, with a cut-off λc of 2.5 mm and an evaluation length of 12.5 mm.

The lower limit of the average length RSm of a roughness curve element of the front face of the light diffusion layer 12 is preferably 30 μm, more preferably 40 μm, and still more preferably 50 μm. On the other hand, the upper limit of the average length RSm of a roughness curve element of the front face of the light diffusion layer 12 is preferably 100 μm, more preferably 80 μm, and still more preferably 60 μm. When the average length RSm of a roughness curve element of the front face of the light diffusion layer 12 is less than the lower limit, the irregularities on the front face of the light diffusion layer 12 are so small that the light diffusibility may be insufficient, whereby it may be impossible to sufficiently inhibit the lack in uniformity of the luminance resulting from the shape and the like of protruding prism portions of the prism sheet 4. To the contrary, when the average length RSm of a roughness curve element of the front face of the light diffusion layer 12 is greater than the upper limit, it may be difficult to form the fine and highly dense irregularities on the front face of the light diffusion layer 12, and thus it may be impossible to sufficiently inhibit the generation of the sparkle resulting from the interference with a pixel pitch of the liquid crystal panel.

The lower limit of the amount (in terms of solid content) of the light diffusion layer 12 overlaid is preferably 2 g/m$^2$, more preferably 2.2 g/m$^2$, and still more preferably 2.4 g/m$^2$. On the other hand, the upper limit of the amount of the light diffusion layer 12 overlaid is preferably 3 g/m$^2$, more preferably 2.8 g/m$^2$, and still more preferably 2.6 g/m$^2$. When the amount of the light diffusion layer 12 overlaid is less than the lower limit, it may be impossible to accurately fix the resin beads 14 by the resin matrix 13, and thus the resin beads 14 may be detached from the light diffusion layer 12. To the contrary, when the amount of the light diffusion layer 12 overlaid is greater than the upper limit, it may be difficult to form the fine and highly dense irregularities on the front face of the light diffusion layer 12, and consequently it may be impossible to sufficiently inhibit the generation of the sparkle resulting from the interference with a pixel pitch of the liquid crystal panel provided on the front face side of the light diffusion sheet for overlaying 5.

The lower limit of the percentage content of the resin matrix 13 in the light diffusion layer 12 is preferably 50% by mass, and more preferably 52% by mass. On the other hand, the upper limit of the percentage content of of the resin matrix 13 in the light diffusion layer 12 is preferably 69% by mass, and more preferably 67% by mass. When the percentage content of of the resin matrix 13 is less than the lower limit, light diffusion properties of the light diffusion layer 12 are excessively enhanced, which may result in a failure to sufficiently enhance the luminance of the liquid crystal display device. To the contrary, when the percentage content of of the resin matrix 13 is greater than the upper limit, the number of the resin beads 14 in the light diffusion layer 12 is not enough, thereby making it difficult to form fine and highly dense irregularities on the front face of the light diffusion layer 12, and thus it may be impossible to sufficiently inhibit the generation of the sparkle resulting from the interference with a pixel pitch of the liquid crystal panel provided on the front face side of the light diffusion sheet for overlaying 5.

The lower limit of the percentage content of the resin beads 14 in the light diffusion layer 12 is preferably 31% by mass, and more preferably 33% by mass. On the other hand, the upper limit of the percentage content of the resin beads 14 in the light diffusion layer 12 is preferably 50% by mass, and more preferably 48% by mass. When the percentage content of the resin beads 14 in the light diffusion layer 12 is less than the lower limit, it may be difficult to form fine and highly dense irregularities on the front face of the light diffusion layer 12, and thus it may be impossible to sufficiently inhibit the generation of the sparkle resulting from the interference with a pixel pitch of the liquid crystal panel provided on the front face side of the light diffusion sheet for overlaying 5. To the contrary, when the percentage content of the resin beads 14 in the light diffusion layer 12 is greater than the upper limit, light diffusion properties of the light diffusion layer 12 are excessively enhanced, which may result in a failure to sufficiently enhance the luminance of the liquid crystal display device.

As the resin beads 14, a mixture of first beads and second beads having an average particle diameter less than that of the first beads is preferably used. In the light diffusion sheet for overlaying 5, by forming the irregularities of the light diffusion layer 12 with the resin beads 14 being a mixture including in addition to first beads, the second beads having an average particle diameter less than that of the first beads, more fine irregularities can be formed on the light diffusion layer 12. Therefore, by using the mixture of the first beads and the second beads as the resin beads 14 in the light diffusion sheet for overlaying 5, the generation of the sparkle resulting from the interference with a pixel pitch of the liquid crystal panel can be easily inhibited due to fine irregularities formed resulting from the second resin beads.

In the case where the resin beads 14 include the first beads and the second beads, the average particle diameter D50 of the second beads may be, for example, no less than 1.9 μm and no greater than 2.5 μm. Whereas, the average particle diameter D50 of the first beads may be, for example, no less than 5 μm and no greater than 6.5 μm. According to the light diffusion sheet for overlaying 5, sticking with the liquid crystal panel is likely to be prevented while the generation of the sparkle resulting from the interference with a pixel pitch of the liquid crystal panel is inhibited, owing to the first beads and the second beads thus having the average particle diameter D50 falls within the above range.

In the case where the resin beads 14 includes the first beads and the second beads, the lower limit of the ratio (mass ratio) of the content of the second beads to the content of the first beads is preferably 0.4, and more preferably 0.45. On the other hand, the upper limit of the ratio of the content of the second beads to the content of the first beads is preferably 0.6, and more preferably 0.55. When the ratio of the content is less than the lower limit, it may be difficult to inhibit the generation of the sparkle resulting from the interference with a pixel pitch of the liquid crystal panel. To the contrary, when the ratio of the content is greater than the upper limit, the irregularities on the front face of the light diffusion layer 12 are too much uniformized, and thus it may be impossible to suitably diffuse the rays of light.

The lower limit of the haze value of the light diffusion sheet for overlaying 5 is preferably 50%, and more preferably 52%. On the other hand, the upper limit of the haze value of the light diffusion sheet for overlaying 5 is preferably 70%, and more preferably 68%. When the haze value of the light diffusion sheet for overlaying 5 is less than the lower limit, it may be impossible to sufficiently inhibit the lack in uniformity of the luminance resulting from the shape and the like of protruding prism portions of the prism sheet 4, and the generation of the sparkle resulting from the interference with a pixel pitch of the liquid crystal panel. To the contrary, when the haze value of the light diffusion sheet for overlaying 5 is greater than the upper limit, the luminance of the liquid crystal display device may be insufficient. It is to be noted that "haze value" as referred to means a value determined in accordance with JIS-K7361: 2,000.

Figure 3:
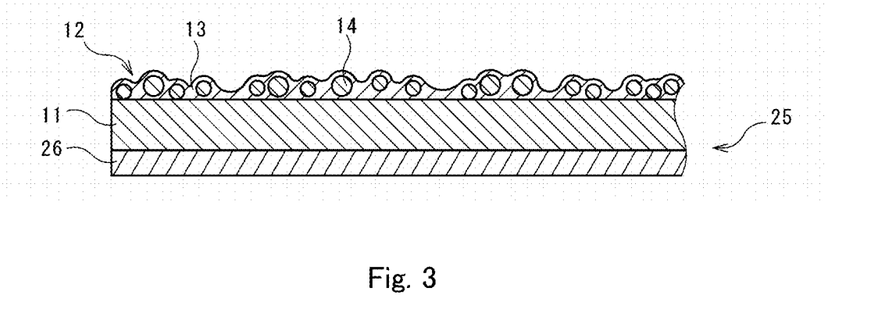
FIG. 3 shows a schematic cross sectional view illustrating a light diffusion sheet for overlaying according to another embodiment differing from the light diffusion sheet for overlaying of the backlight unit shown in FIG. 1.

As shown in FIG. 3, it is preferred in the backlight unit that a plurality of resin beads 14 are provided in regions corresponding the areas, respectively, between vertices of adjacent protruding prism portions 16 in a cross section perpendicular to ridgelines of the protruding prism portions 16 of the prism sheet 4 described later (i.e., areas between straight lines that pass vertices of the protruding prism portions 16, and that are perpendicular to the back face of the prism sheet 4). In addition, the lower limit of ratio of the average particle diameter D50 of the resin beads 14 to the average pitch p of the ridgelines of the prism sheet 4 is preferably 0.06, and more preferably 0.08. On the other hand, the upper limit of the ratio of the average particle diameter D50 of the resin beads 14 to the average pitch p of the ridgelines of the prism sheet 4 is preferably 0.25, and more preferably 0.23. When the ratio of the average particle diameter D50 of the resin beads 14 to the average pitch p of the ridgelines of the prism sheet 4 is less than the lower limit, it may be impossible to sufficiently inhibit the lack in uniformity of the luminance resulting from the shape and the like of the protruding prism portions 16 of the prism sheet 4. To the contrary, when the ratio of the average particle diameter D50 of the resin beads 14 to the average pitch p of the ridgelines of the prism sheet 4 is greater than the upper limit, it may be difficult to form fine and highly dense irregularities on the front face of the light diffusion layer 12, and thus it may be impossible to sufficiently inhibit the generation of the sparkle resulting from the interference with a pixel pitch of the liquid crystal panel provided on the front face side of the light diffusion sheet for overlaying 5.

Prism Sheet

Due to a feature of transmission of rays of light required for the prism sheet 4, a transparent, particularly colorless transparent, synthetic resin is used as a principal component for forming the resin matrix 13. The prism sheet 4 includes: a substrate layer 15; and projection lines constituted with a plurality of protruding prism portion 16 overlaid on the front face of the substrate layer 15. The protruding prism portions 16 are overlaid on the front face of the substrate layer 15 in a striped pattern. The protruding prism portion 16 is triangular prism-shaped, with the back face thereof being in contact with the front face of the substrate layer 15.

The lower limit of the thickness of the prism sheet 4 (i.e., the level from the back face of the substrate layer 15 to the vertex of the protruding prism portion 16) is preferably 50 μm, and more preferably 100 μm. On the other hand, the upper limit of the thickness of the prism sheet 4 is preferably 200 μm, and more preferably 180 μm. Further, the lower limit of the pitch p of the protruding prism portions 16 of the prism sheet 4 (see FIG. 3) is preferably 20 μm, and more preferably 30 μm. On the other hand, the upper limit of a pitch p of the protruding prism portions 16 of the prism sheet 4 is preferably 100 μm, and more preferably 60 μm. In addition, a vertical angle of the protruding prism portion 16 is preferably no less than 85° and no greater than 95°. Moreover, the lower limit of a refractive index of the protruding prism portion 16 is preferably 1.5, and more preferably 1.55. On the other hand, the upper limit of a refractive index of the protruding prism portion 16 is preferably 1.7.

It is to be noted that the backlight unit is not necessarily limited to such a structure having only one prism sheet 4, and other prism sheet may be further included which is superposed on the prism sheet 4. In such a case, it is preferred that the ridgelines of a plurality of protruding prism portions 16 of the prism sheet 4 are perpendicular to ridgelines of a plurality of protruding prism portions of the other prism sheet. When the ridgelines of the protruding prism portion 16 of the prism sheet 4 are thus perpendicular to the ridgelines of the protruding prism portions of the other prism sheet, rays of light that enter from the light diffusion sheet for underlaying 3 are refracted toward the normal direction side by one prism sheet, and further the rays of light that exit from the one prism sheet can be refracted by the other prism sheet so as to proceed substantially perpendicularly to the back face of the light diffusion sheet for overlaying 5. It is to be noted that a forming material, a thickness, a pitch of the protruding prism portion, a vertical angle of the protruding prism portion, and a refractive index of the protruding prism portion of the other prism sheet may be similar to those of the prism sheet 4.

Optical Waveguide Sheet

The optical waveguide sheet 1 is a sheet-shaped optical member that allows rays of light exiting from a light source 2 to exit from the front face thereof, while permitting propagation of the rays inside. The optical waveguide sheet 1 may be formed to have a substantially wedge shape in cross section, or may be formed to be substantially tabular. Due to a necessity for having translucency, a transparent, particularly colorless transparent, resin is used as a principal component for forming the optical waveguide sheet 1. The principal component of the optical waveguide sheet 1 is not particularly limited, and is exemplified by synthetic resins such as a polycarbonate that is superior in transparency, strength, etc., and an acrylic resin that is superior in transparency, scuff resistance, etc. Among these, the principal component of the optical waveguide sheet 1 is preferably a polycarbonate. Since a polycarbonate has superior transparency and a high refractive index, total reflection readily occurs at a boundary with an air layer (i.e., a layer formed in a gap from the light diffusion sheet for underlaying 3 provided on the front face side of the optical waveguide sheet 1; and a layer formed in a gap from the reflection sheet 6 provided on the back face side of the optical waveguide sheet 1), thereby enabling the rays of light to be efficiently propagated. In addition, due to having heat resistance, a polycarbonate is less likely to be accompanied by deterioration and the like resulting from heat generation by the light source 2.

Light Source

The light source 2 is provided such that an irradiated face is opposed to (or in contact with) an end face of the optical waveguide sheet 1. A variety of light source 2 can be used, and for example, a light emitting diode (LED) can be used. Specifically, a plurality of light emitting diodes may be provided along the end face of the optical waveguide sheet 1 for use as the light source 2.

Light Diffusion Sheet for Underlaying

The light diffusion sheet for underlaying 3 includes: a substrate layer 17; a light diffusion layer 18 provided on the front face side of the substrate layer 17; and a sticking preventive layer 19 provided on the back face side of the substrate layer 17. The substrate layer 17 of the light diffusion sheet for underlaying 3 may have a similar structure to the substrate layer 11 of the light diffusion sheet for overlaying 5 described above. The light diffusion layer 18 of the light diffusion sheet for underlaying 3 includes a light diffusion material, and a binder of the same.

The light diffusion material may be particles having a property of allowing rays of light to be diffused, and can be generally classified into inorganic fillers and organic fillers. Examples of the inorganic filler include silica, aluminum hydroxide, aluminum oxide, zinc oxide, barium sulfide, magnesium silicate, and a mixture thereof. Specific material for the organic filler include an acrylic resin, an acrylonitrile resin, polyurethane, polyvinyl chloride, polystyrene, polyamide, polyacrylonitrile, and the like. Of these, acrylic resins superior in transparency are preferred, and polymethylmethacrylate (PMMA) is particularly preferred.

The shape of the light diffusion material is not particularly limited, and may be for example, spherical, cubic, needle-like, rod-like, spindle, platy, flaky, fibrous or the like, and of these, the shape is preferably spherical beads having superior light diffusibility.

The lower limit of the average particle diameter of light diffusion material is preferably 8 µm, and more preferably 10 µm. On the other hand, the upper limit of the average particle diameter of light diffusion material is preferably 50 µm, more preferably 20 µm, and still more preferably 15 µm. When the average particle diameter of the light diffusion material is less than the lower limit, irregularities on the front face of the light diffusion layer 18 become so small that the light diffusibility necessitated as the light diffusion sheet for underlaying 3 may not be attained. To the contrary, when the average particle diameter of the light diffusion material is greater than the upper limit, the thickness of the light diffusion sheet for underlaying 3 increases, and uniform diffusion may be difficult.

The lower limit of the percentage content of the binder in the light diffusion layer 18 is preferably 15% by mass, and more preferably 30% by mass. On the other hand, the upper limit of the percentage content of the binder in the light diffusion layer 18 is preferably 48% by mass, and more preferably 45% by mass. When the percentage content of the binder is less than the lower limit, the light diffusion material may not be accurately fixed by the binder. To the contrary, when the percentage content of the binder is greater than the upper limit, the light diffusibility may be insufficient.

The lower limit of the percentage content of the light diffusion material in the light diffusion layer 18 is preferably 52% by mass, and more preferably 55% by mass. On the other hand, the upper limit of the percentage content of the light diffusion material in the light diffusion layer 18 is preferably 85% by mass, and more preferably 70% by mass. When the percentage content of the light diffusion material in the light diffusion layer 18 is less than the lower limit, the light diffusibility may be insufficient. To the contrary, when the percentage content of the light diffusion material in the light diffusion layer 18 is greater than the upper limit, the light diffusion material may not be accurately fixed by the binder.

The lower limit of the arithmetic average roughness Ra of the front face of the light diffusion layer 18 is preferably 1.1 µm, more preferably 1.3 µm, and still more preferably 1.4 µm. On the other hand, the upper limit of the arithmetic average roughness Ra of the front face of the light diffusion layer 18 is preferably 5 µm, more preferably 3 µm, and still more preferably 2 µm. When the arithmetic average roughness Ra of the front face of the light diffusion layer 18 is less than the lower limit, the light diffusibility may be insufficient. To the contrary, the arithmetic average roughness Ra of the front face of the light diffusion layer 18 is greater than the upper limit, the luminance of the liquid crystal display device may be insufficient through a decrease in the light transmittance.

The lower limit of the ten-point mean roughness Rz of the front face of the light diffusion layer 18 is preferably 5 µm, more preferably 6 µm, and still more preferably 7 µm. On the other hand, the upper limit of the ten-point mean roughness Rz of the front face of the light diffusion layer 18 is preferably 20 µm, more preferably 15 µm, and still more preferably 10 µm. When the ten-point mean roughness Rz of the front face of the light diffusion layer 18 is less than the lower limit, the light diffusibility may be insufficient. To the contrary, when the ten-point mean roughness Rz of the front face of the light diffusion layer 18 is greater than the upper limit, the luminance of the liquid crystal display device may be insufficient through a decrease in the light transmittance.

The lower limit of the root mean square roughness Rq of the front face of the light diffusion layer 18 is preferably 1.2 µm, more preferably 1.5 µm, and still more preferably 1.7 µm. On the other hand, the upper limit of the root mean square roughness Rq of the front face of the light diffusion layer 18 is preferably 2.5 µm, more preferably 2.2 µm, and still more preferably 2 µm. When the root mean square roughness Rq of the front face of the light diffusion layer 18 is less than the lower limit, the light diffusibility may be insufficient. To the contrary, when the root mean square roughness Rq of the front face of the light diffusion layer 18 is greater than the upper limit, the luminance of the liquid crystal display device may be insufficient through a decrease in the light transmittance.

The sticking preventive layer 19 is formed by dispersing resin beads in a resin matrix. The resin beads are provided on the back face side of the substrate layer 17 in a scattering manner. Due to the resin beads provided in a scattering manner, the sticking preventive layer 19 has a plurality of protruding parts formed resulting from the resin beads, and a flat area in which the resin beads are not present. The sticking preventive layer 19 is in contact at a plurality of protruding parts in a scattering manner with the optical waveguide sheet provided on the back face side thereof, without being in contact on the entire back face, thereby preventing the sticking, and inhibiting lack in uniformity of the luminance of the liquid crystal display device.

The lower limit of the haze value of the light diffusion sheet for underlaying 3 is preferably 80%, more preferably 85%, and still more preferably 90%. When the haze value of the light diffusion sheet for underlaying 3 is less than the lower limit, the light diffusibility may be insufficient. It is to be noted that the upper limit of the haze value of the light diffusion sheet for underlaying 3 may be, for example, 95%.

Reflection Sheet

The reflection sheet 6 is exemplified by: a white sheet in which a filler is contained through dispersion in a base resin such as a polyester; a mirror sheet having an enhanced regular reflection property through vapor deposition of a metal such as aluminum or silver on the surface of a film formed of a polyester, etc.; and the like.

Advantages

Due to having the resin matrix 13 and the resin beads 14 in the light diffusion layer 12, the light diffusion sheet for overlaying 5 has irregularities on the front face of the light diffusion layer 12 formed resulting from the resin beads 14. Therefore, according to the light diffusion sheet for overlaying 5, the lack in uniformity of the luminance resulting from the shape and the like of the protruding prism portions 16 of the prism sheet 4 can be inhibited through diffusing the rays of light that enter from the back face side by means of the irregularities. In addition, the light diffusion sheet for overlaying 5 is capable of inhibiting the generation of the sparkle resulting from the interference with a pixel pitch of the liquid crystal panel since formation of fine and highly dense irregularities is enabled at random due to the mode diameter in the volume-weighted particle size distribution and the density of the resin beads 14 per unit area, and the average thickness of the light diffusion layer 12 falling within the above range.

Since the light diffusion sheet for overlaying 5 is superposed on the front face side of the prism sheet 4 in the backlight unit, the lack in uniformity of the luminance resulting from the shape and the like of the protruding prism portions 16 of the prism sheet 4 can be inhibited through diffusing the rays of light that exit from the prism sheet 4 by means of the irregularities formed on the front face of the light diffusion layer 12 of the light diffusion sheet for overlaying 5. In addition, the backlight unit is capable of inhibiting the generation of the sparkle resulting from the interference with a pixel pitch of the liquid crystal panel since formation of fine and highly dense irregularities is enabled at random due to the mode diameter in the volume-weighted particle size distribution and the density of the resin beads 14 per unit area, and the average thickness of the light diffusion layer of the light diffusion sheet for overlaying 5 falling within the above range.

Production Method of Light Diffusion Sheet for Overlaying

A production method of a light diffusion sheet for overlaying 5 comprises the steps of: forming a sheet element that constitutes a substrate layer 11 (substrate layer forming step); and overlaying a light diffusion layer 12 on at least one face side of the sheet element (light diffusion layer overlaying step).

Substrate Layer Forming Step

The substrate layer forming step is not particularly limited, and a procedure including: subjecting a molten thermoplastic resin to extrusion molding through a T die; and subsequently forming a sheet element by drawing the extrusion-molded product in a longitudinal direction and a width direction of the layer may be exemplified. Well-known extrusion molding processes employing the T die may include, for example, a polishing roll process and a chill roll process. Also, film drawing processes of the sheet element may include, for example, a biaxial drawing process for tubular films, a biaxial drawing process for flat films, and the like.

Light Diffusion Layer Overlaying Step

The light diffusion layer overlaying step includes the steps of: preparing a coating liquid containing the resin matrix 13 and the resin beads 14 (preparation step); applying the coating liquid prepared in the preparation step on one face side of the sheet element (applying step); and hardening through drying the coating liquid applied in the applying step (hardening step). In the preparation step, it is preferred that a coating liquid is prepared which contains in addition to an active energy ray-curable resin as a principal component of the resin matrix 13, a mixture of the aforementioned first beads and second beads as the resin beads 14. In the production method of the light diffusion sheet for overlaying, by using the active energy ray-curable resin as a principal component of the resin matrix 13, it is easy to comparatively quickly harden the active energy ray-curable resin after applying the coating liquid in the applying step, through irradiating the resin with, for example, a ultraviolet ray in the hardening step. Thus, by hardening active energy ray-curable resin in a state in which the resin beads 14 are spaced away from one face of the sheet element, the resin beads 14 can be readily fixed in a state of being spaced away from one face of the sheet element. Moreover, by preparing the coating liquid containing the mixture of the first beads and second beads as the resin beads 14 in the preparation step of the production method of the light diffusion sheet for overlaying, many resin beads having a comparatively small particle size can be included in the light diffusion layer 12, and thus due to the resin beads having a smaller particle size, sticking with the liquid crystal panel can be prevented by the resin beads having a larger particle size, while the generation of a sparkle resulting from the interference with a pixel pitch of the liquid crystal panel is inhibited.

It is to be noted that the production method of the light diffusion sheet for overlaying may further comprise before the light diffusion layer overlaying step, a surface treatment step of subjecting a face of the sheet element on a side where the light diffusion layer is to be overlaid, to a corona discharge treatment, an ozone treatment, a low-temperature plasma treatment, a glow discharge treatment, an oxidization treatment, a primer coating treatment, an undercoating treatment, an anchor coating treatment, etc.

Light Diffusion Sheet for Overlaying

The light diffusion sheet for overlaying 25 shown in FIG. 3 may be used in the backlight unit shown in FIG. 1, in place of the light diffusion sheet for overlaying 5 shown in FIG. 1. The light diffusion sheet for overlaying 25 allows the rays of light that enter from the back face side to be diffused to some extent, thereby inhibiting lack in uniformity of the luminance resulting from the shape and the like of protruding prism portions of the prism sheet, and inhibiting generation of a sparkle resulting from the interference with the pixel pitch of a liquid crystal panel (not shown in the Figure) provided on the front face side of the light diffusion sheet for overlaying 25. The light diffusion sheet for overlaying 25 comprises a substrate layer 11, a light diffusion layer 12 overlaid on the front face side of the substrate layer 11; and a sticking preventive layer 26 overlaid on the back face side of the substrate layer 11. The light diffusion sheet for overlaying 25 is constituted as a three-layer structure that includes: the substrate layer 11; the light diffusion layer 12 overlaid directly on the front face of the substrate layer 11; and a sticking preventive layer 26 overlaid directly on the back face of the substrate layer 11. Since the substrate layer 11 and the light diffusion layer 12 of the light diffusion sheet for overlaying 25 are similar to those of the light diffusion sheet for overlaying 5 shown in FIG. 1, description of these is omitted by denoting each identical reference number.

Sticking Preventive Layer

The sticking preventive layer 26 constitutes the rearmost surface of the light diffusion sheet for overlaying 25. Due to a feature of transmission of rays of light required for the sticking preventive layer 26, a transparent, particularly colorless transparent, synthetic resin is used as a principal component for forming the sticking preventive layer 26. The sticking preventive layer 26 is constituted to be a film form having a substantially even thickness and having a flat back face. The sticking preventive layer 26 is constituted so as to be partially in contact with tops of the protruding prism portions of the prism sheet provided on the back face side of the light diffusion sheet for overlaying 25, thereby preventing the sticking with the prism sheet. The principal component of the sticking preventive layer 26 is exemplified by a polycarbonate, an acrylic resin, polyethylene terephthalate, polyethylene naphthalate, a polystyrene, a methyl (meth) acrylate-styrene copolymer, a polyolefin, a cycloolefin polymer, a cycloolefin copolymer, cellulose acetate, weather resistant vinyl chloride, an active energy ray-curable resin, and the like. Among these, an acrylic resin is preferred which enhances the strength of the back face of the light diffusion sheet for overlaying 25, and thus the scratch of the back face is likely to be prevented.

The lower limit of the average thickness of the sticking preventive layer 26 is preferably 1 μm, and more preferably 2 μm. On the other hand, the upper limit of the average thickness of the sticking preventive layer 26 is preferably 10 μm, and more preferably 8 μm. When the average thickness of the sticking preventive layer 26 is less than the lower limit, it may be impossible to accurately prevent the scratch of the back face of the light diffusion sheet for overlaying 25. To the contrary, when the average thickness of the sticking preventive layer 26 is greater than the upper limit, the luminance of the liquid crystal display device may be lowered.

The upper limit of the arithmetic average roughness Ra of the back face of the sticking preventive layer 26 is preferably 0.04 μm, more preferably 0.035 μm, and still more preferably 0.03 μm. When the arithmetic average roughness Ra of the back face of the sticking preventive layer 26 is greater than the upper limit, the scratch may be generated at the protruding prism portions of the prism sheet resulting from the contact with the sticking preventive layer 26. It is to be noted that the lower limit of the arithmetic average roughness Ra of the back face of the sticking preventive layer 26 is not particularly limited, and may be, for example 0.01 μm.

Production Method of Light Diffusion Sheet for Overlaying

A production method of a light diffusion sheet for overlaying 25 comprises the steps of: forming a sheet element that constitutes a substrate layer 11 (substrate layer forming step); overlaying a light diffusion layer 12 on at least one face side of the sheet element (light diffusion layer overlaying step); and overlaying a sticking preventive layer 26 on other face side of the sheet element that constitutes the substrate layer 11 (sticking preventive layer overlaying step).

Sticking Preventive Layer Overlaying Step

As the sticking preventive layer overlaying step, for example: a procedure of forming the sticking preventive layer 26 concomitantly with the sheet element that constitutes the substrate layer 11 by a coextrusion process; and a procedure of overlaying the sticking preventive layer 26 by coating on the other face side of the sheet element may be exemplified.

It is to be noted that the substrate layer forming step in the production method of the light diffusion sheet for overlaying 25 may be carried out concomitantly with the sticking preventive layer overlaying step by a coextrusion process as described above, or may be carried out separately from the sticking preventive layer overlaying step. In the case of carrying out the substrate layer forming step separately from the sticking preventive layer forming step, the substrate layer forming step can be carried out by a similar procedure to the substrate layer forming step of the light diffusion sheet for overlaying 5 shown in FIG. 1. Furthermore, the light diffusion layer overlaying step in the production method of the light diffusion sheet for overlaying 25 can be carried out by a similar procedure to the light diffusion layer overlaying step in the production method of the light diffusion sheet for overlaying 5 shown in FIG. 1.

Advantages

Due to the sticking preventive layer 26 being overlaid on the back face side of the substrate layer 11, the light diffusion sheet for overlaying 25 inhibits the lack in uniformity of the luminance resulting from a shape and the like of protruding prism portions of a prism sheet, and is capable of inhibiting the generation of a sparkle resulting from the interference with a pixel pitch of the liquid crystal panel. In addition, the light diffusion sheet for overlaying 25 enables a sticking preventive property with the prism sheet, and a scratch preventive property of the back face of the light diffusion sheet for overlaying 25 to be improved.

Liquid Crystal Display Module

Figure 4:
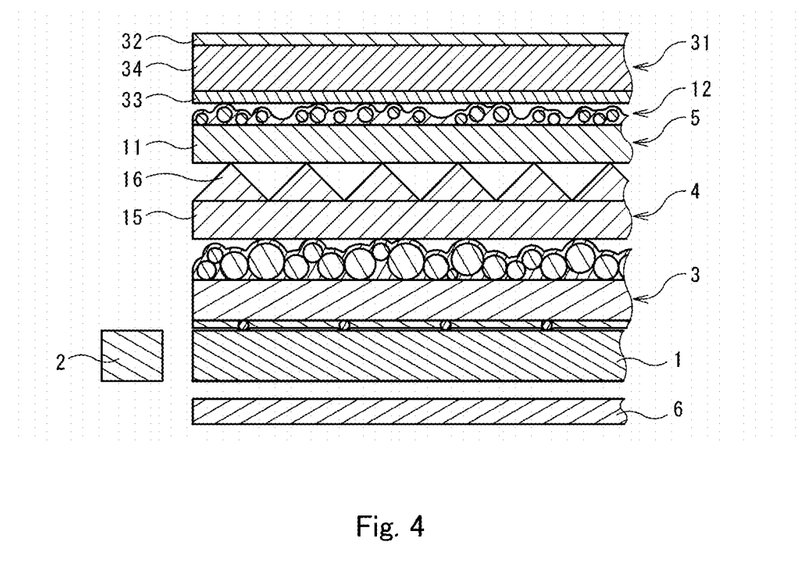
FIG. 4 shows a schematic cross sectional view illustrating a liquid crystal display module according to an embodiment of the present invention.

The liquid crystal display module shown in FIG. 4 comprises: the optical waveguide sheet 1 for guiding rays of light that enter from an end face to the front face side; the light source 2 for allowing the end face of the optical waveguide sheet 1 to be irradiated with the rays of light; the light diffusion sheet for underlaying 3 that is superposed on the front face side of the optical waveguide sheet 1; the prism sheet 4 provided on the front face side of the light diffusion sheet for underlaying 3; the light diffusion sheet for overlaying 5 superposed on the front face side of the prism sheet 4; the reflection sheet 6 provided on the back face side of the optical waveguide sheet 1; and a liquid crystal panel 31 superposed on the front face side of the light diffusion sheet for overlaying 5. In other words, the liquid crystal display module has a constitution in which the backlight unit shown in FIG. 1 is provided with the liquid crystal panel 31 on the front face side of the light diffusion sheet for overlaying 5.

Liquid Crystal Panel

The liquid crystal panel 31 is provided directly, i.e., without any other sheet, etc., being interposed, on the front face of the light diffusion sheet for overlaying 5. The liquid crystal panel 31 has a front face side-polarizing plate 32 and a back face side-polarizing plate 33 which are disposed in a substantially parallel manner with a certain interval, and a liquid crystal cell 34 provided therebetween. The front face side-polarizing plate 32 and the back face side-polarizing plate 33 are, for example, constituted with polarizers such as an iodine-based polarizer, a dye-based polarizer and a polyene-based polarizer, and a pair of transparent protective films provided on both sides of the same. The front face side-polarizing plate 32 and the back face side-polarizing plate are orthogonal each other with respect to their transmission axial orientations.

The liquid crystal cell 34 has a function to control the amount of transmitted light, and a variety of well-known ones may be employed. The liquid crystal cell 34 has generally a layer structure constituted with a basal plate, a color filter, a counter electrode, a liquid crystal layer, a pixel electrode, and a basal plate. For this pixel electrode, a transparent conductive film such as ITO or the like may be used. As a display mode of the aforementioned liquid crystal cell, for example, TN (Twisted Nematic), VA (Virtical Alignment), IPS (In-Place Switching), FLC (Ferroelectric Liquid Crystal), AFLC (Anti-ferroelectric Liquid Crystal), OCB (Optically Compensatory Bend), STN (Supper Twisted Nematic), HAN (Hybrid Aligned Nematic) or the like proposed hitherto may be used. A pixel pitch of the liquid crystal panel 31 (pixel pitch of the liquid crystal cell) may be, for example, no greater than 25 μm.

Advantages

Due to having the light diffusion sheet for overlaying 5, the liquid crystal display module is capable of inhibiting the lack in uniformity of the luminance resulting from the shape and the like of the protruding prism portions 16 of the prism sheet 4. In addition, since the liquid crystal display module is provided with the light diffusion sheet for overlaying 5 on the back face side of the liquid crystal panel 31, generation of the sparkle resulting from the irregularities formed on the front face of the light diffusion layer 12 of the light diffusion sheet for overlaying 5, and from the interference with the pixel pitch of the liquid crystal panel 31 can be inhibited.

Other Embodiments

Additionally, the light diffusion sheet for overlaying and the backlight unit according to the present invention may be practiced in various modified or improved embodiments other than those as described above. For example, the backlight unit may have on the front face side of the optical waveguide sheet, other optical sheet than the light diffusion sheet for overlaying, the prism sheet and the light diffusion sheet for underlaying. Moreover, the backlight unit may not necessarily be the edge-lit backlight unit, and may be, for example, a direct-lit backlight unit in which a diffusion plate and a light source provided on the back face side of the light diffusion sheet for underlaying.

Specific structures of the prism sheet, the light diffusion sheet, the optical waveguide sheet, the light source and the reflection sheet in the backlight unit are not particularly limited, and a variety of structures can be adopted.

The light diffusion sheet for overlaying preferably has a two-layer structure comprising a substrate layer and a light diffusion layer, or has a three-layer structure comprising a substrate layer, a light diffusion layer and a sticking preventive layer; however, other layer may be included between the substrate layer and the light diffusion layer, or between the substrate layer and the sticking preventive layer.

The backlight unit can be used for: personal computers; comparatively large visual display units such as liquid crystal televisions; mobile phone terminals such as smartphones; portable information terminals such as tablet terminals.

EXAMPLES

Hereinafter, the embodiment of the present invention will be explained in detail by way of Examples, but the present invention is not in any way limited to these Examples.

Example 1

Figure 6:
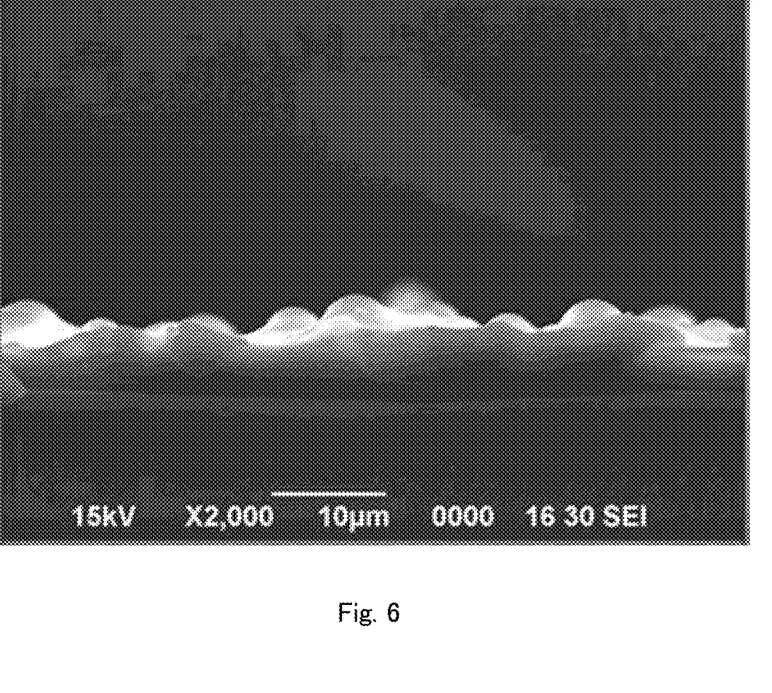
FIG. 6 shows a partially enlarged cross sectional photograph illustrating the light diffusion sheet for overlaying of Example 1.

A light diffusion layer in which resin beads were dispersed in a resin matrix containing a ultraviolet ray-curable resin as a principal component was overlaid on the front face of a substrate layer containing polyethylene terephthalate as a principal component and having an average thickness of 75 μm to produce a light diffusion sheet for overlaying of Example 1. As the resin beads, a mixture of first beads having a greater average particle diameter and second beads having an average particle diameter smaller than that of the first beads, with the mixing ratio of the first beads and the second beads being 2:1 by mass, was used. Further, the amount of the light diffusion layer overlaid was 2.5 g/m$^2$; the percentage content of the resin matrix in light diffusion layer was 66.61% by mass; and the average thickness of the light diffusion layer was 3.5 μm. It is to be noted that FIG. 6 shows a partially enlarged cross sectional photograph illustrating the light diffusion sheet for overlaying of Example 1.

Example 2

A light diffusion sheet for overlaying of Example 2 was produced in a similar manner to Example 1 except that the content of the resin matrix in light diffusion layer was 52.57% by mass. The average thickness of the light diffusion layer was 3.7 μm.

Example 3

A light diffusion layer in which acrylic resin beads having an average particle diameter of 3 μm were dispersed in a resin matrix containing a ultraviolet ray-curable resin as a principal component was overlaid on the front face of a substrate layer similar to the substrate layer in Example 1 to produce a light diffusion sheet for overlaying of Example 3. the amount of the light diffusion layer overlaid was 3 g/m$^2$; the percentage content of the resin matrix in light diffusion layer was 68.00% by mass; and the average thickness of the light diffusion layer was 3.2 μm.

Comparative Example 1

A light diffusion layer in which acrylic resin beads having an average particle diameter of 8 μm were dispersed in a resin matrix containing a ultraviolet ray-curable resin as a principal component was overlaid on the front face of a substrate layer similar to the substrate layer in Example 1 to produce a light diffusion sheet for overlaying of Comparative Example 1. the amount of the light diffusion layer overlaid was 4 g/m$^2$; the percentage content of the resin matrix in light diffusion layer was 71.40% by mass; and the average thickness of the light diffusion layer was 4.5 μm.

Comparative Example 2

A light diffusion layer in which acrylic resin beads having an average particle diameter of 7 μm were dispersed in a resin matrix containing a ultraviolet ray-curable resin as a principal component was overlaid on the front face of a substrate layer similar to the substrate layer in Example 1 to produce a light diffusion sheet for overlaying of Comparative Example 2. the amount of the light diffusion layer overlaid was 4.1 g/m$^2$; the percentage content of the resin matrix in light diffusion layer was 69.90% by mass; and the average thickness of the light diffusion layer was 4.5 μm.

Mode Diameter

The mode diameter in a volume-weighted particle size distribution of the resin beads in the light diffusion layer was measure by using "Laser Scattering Particle Size Distribution Analyzer LA-950" manufactured by HORIBA, Ltd. The measurement results are shown in Table 1.

Density of Resin Beads

A laser microscope "VK-X 100 series" manufactured by Keyence Corporation was used to execute measurements on laser images at arbitrary ten places obtained by scanning a surface shape of from protruding parts to recessed parts of fine irregularities formed on the front face of the light diffusion layer through irradiating from the front face of the light diffusion layer side with a laser beam. The density of the resin beads per unit area (beads/mm$^2$) at each place was measured, and thus obtained values were averaged to determine the density of the resin beads per unit area in the light diffusion layer. The measurement results are shown in Table 1.

Coefficient of Variation

The coefficient of variation in the volume-weighted particle size distribution of resin beads was measured by using "Laser Scattering Particle Size Distribution Analyzer LA-950" manufactured by HORIBA, Ltd., through: determining volume distribution of the resin beads from analyzed scattering light of the resin beads; and dividing the arithmetic standard deviation by the mean value. The measurement results are shown in Table 1.

Particle Size Amplitude

The particle size amplitude in the volume-weighted particle size distribution of resin beads in the light diffusion layer was measured by using "Laser Scattering Particle Size Distribution Analyzer LA-950" manufactured by HORIBA, Ltd. The measurement results are shown in Table 1.

Particle Size

The average particle diameter D50 and particle diameter D70 on the volume-weighted particle size distribution of resin beads in the light diffusion layer, as determined on accumulated resin beads with increasing diameter from the smaller one were measured by using "Laser Scattering Particle Size Distribution Analyzer LA-950" manufactured by HORIBA, Ltd. The measurement results are shown in Table 1.

Arithmetic Average Roughness Ra, Average Length RSm of Roughness Curve Element

The arithmetic average roughness Ra and the average length RSm of a roughness curve element the front face of the light diffusion layer were measured in accordance with JIS-B0601: 2001, with a cut-off λc of 2.5 mm and an evaluation length of 12.5 mm. The measurement results are shown in Table 1.

Ten-Point Mean Roughness Rz

The ten-point mean roughness Rz of the front face of the light diffusion layer was measured in accordance with JIS-B0601: 1994, with a cut-off λc of 2.5 mm and an evaluation length of 12.5 mm. The measurement results are shown in Table 1.

Haze Value

The haze value of the light diffusion sheet for overlaying was measured in accordance with JIS-K7361: 2000 by using "HZ-2" manufactured by Suga Test Instruments Co., Ltd. The measurement results are shown in Table 1.

according to the prism shape was visually observed, which was evaluated according to the following criteria. The results of the evaluations are shown in Table 2.

A not any lack in uniformity of luminance according to the prism shape observed.

B lack in uniformity of luminance according to the prism shape observed.

Scratchability of Light Diffusion Sheet for Overlaying

The light diffusion sheets for overlaying of Examples 1 to 3, and Comparative Examples 1 and 2 were subjected to die cutting processing, thereby giving a rectangular shape of 22.10 cm×12.45 cm, so that 500 pieces of samples were produced, respectively. The presence or absence of a scratch of 0.15 mm or longer was observed on these samples, and evaluated according to the following criteria. The results of the evaluation are shown in Table 2.

A: rate of samples having a scratch of 0.15 mm or longer being less than 2%.

B rate of samples having a scratch of 0.15 mm or longer being no less than 2% and less than 7%.

C rate of samples having a scratch of 0.15 mm or longer exceeding 11%.

TABLE 1

| | Light diffusion sheet for overlaying | | | | | | | | | | |
|---|---|---|---|---|---|---|---|---|---|---|---|
| | Light diffusion layer | | | | | | | | | | |
| | | | | average | | Resin beads | | | | | |
| | average thickness (μm) | arithmetic average roughness Ra (μm) | ten-point mean roughness Rz (μm) | length of roughness curve element RSm (μm) | mode diameter (μm) | density (beads/mm²) | coefficient of variation (%) | particle size amplitude (μm) | average particle diameter D50 (μm) | particle diameter D70 (μm) | haze value (%) |
| Example 1 | 3.5 | 0.5 | 3.0 | 67.7 | 5.1 | 13412 | 41.3 | 18.0 | 5.1 | 6.2 | 53 |
| Example 2 | 3.7 | 0.6 | 3.5 | 51.5 | 5.1 | 17804 | 38.5 | 15.3 | 4.8 | 5.5 | 68 |
| Example 3 | 2.8 | 0.5 | 1.8 | 45.7 | 3.2 | 16225 | 9.2 | 2.0 | 3.2 | 3.6 | 50 |
| Comparative Example 1 | 4.5 | 1.0 | 4.7 | 91.3 | 7.7 | 4023 | 42.6 | 23.8 | 7.7 | 9.2 | 50 |
| Comparative Example 2 | 4.5 | 0.8 | 4.2 | 78.7 | 6.2 | 7853 | 42.1 | 19.0 | 6.2 | 7.7 | 50 |

Presence or Absence of Sparkle

The light diffusion sheets for overlaying of Examples 1 to 3, and Comparative Examples 1 and 2 were each incorporated between a prism sheet and a liquid crystal panel of an edge-lit backlight unit of a liquid crystal display device, and the presence or absence of the sparkle was visually observed, which was evaluated according to the following criteria. The results of the evaluations are shown in Table 2.

A: not any sparkle observed.

B: sparkle can be found by thorough observation, but no sparkle can be found by common visual observation.

C: sparkle found by common visual observation.

Presence or Absence of Lack in Uniformity of Luminance According to Prism Shape

The light diffusion sheets for overlaying of Examples to 3, and Comparative Examples 1 and 2 were each incorporated between a prism sheet and a liquid crystal panel of an edge-lit backlight unit of a liquid crystal display device, and the presence or absence of lack in uniformity of luminance

TABLE 2

| | Presence or absence of sparkle | Presence or absence of lack in uniformity of luminance | Scratchability |
|---|---|---|---|
| Example 1 | B | A | B |
| Example 2 | A | A | B |
| Example 3 | A | A | C |
| Comparative Example 1 | C | A | A |
| Comparative Example 2 | C | A | A |

Results of Evaluations

As shown in Table 2, it was proven that, due to the mode diameter in a volume-weighted particle size distribution of resin beads, the density of the resin beads per unit area and the average thickness of the light diffusion layer being the values as described above, the light diffusion sheets for overlaying of Examples 1 to 3 were capable of inhibiting both: the sparkle resulting from the interference with the pixel pitch of the liquid crystal panel; and the lack in uniformity of luminance according to the prism shape. Furthermore, according to the light diffusion sheet for overlaying of Example 2, it was proven that more accurate inhibition of the generation of the sparkle was enabled since finer and more highly dense irregularities were formed on the front face than the light diffusion layer of the light diffusion sheet for overlaying of Example 1. In addition, although the light diffusion sheet for overlaying of Example 3 was capable of accurately inhibiting the generation of the sparkle, it was proven that promoted microfabrication of the irregularities on the front face of the light diffusion layer resulted in the front face being more likely to be scratched, and in deteriorated handleability. To the contrary, the light diffusion sheets for overlaying of Comparative Examples 1 and 2 were revealed to be not capable of inhibiting the generation of the sparkle, which would have resulted from the rough irregularities on the front face of the light diffusion layer.

INDUSTRIAL APPLICABILITY

As described in the foregoing, the light diffusion sheet for overlaying and the backlight unit of the present invention are capable of inhibiting the generation of a sparkle resulting from the interference with a pixel pitch of the liquid crystal panel while lack in uniformity of the luminance resulting from a shape and the like of protruding prism portions of a prism sheet is inhibited; therefore, these can be suitably used for a variety of liquid crystal display devices.

EXPLANATION OF THE REFERENCE SYMBOLS 1 optical waveguide sheet
2 light source
3 light diffusion sheet for underlaying
4 prism sheet
5 light diffusion sheet for overlaying
6 reflection sheet
11 substrate layer
12 light diffusion layer
13 resin matrix
14 resin beads
15 substrate layer
16 protruding prism portion
17 substrate layer
18 light diffusion layer
19 sticking preventive layer
25 light diffusion sheet for overlaying
26 sticking preventive layer
31 liquid crystal panel
32 front face side polarizing plate
33 back face side polarizing plate
34 liquid crystal cell
101 edge-lit backlight unit
102 light source
103 optical waveguide plate
104 optical sheet
105 reflection sheet
106 light diffusion sheet for underlaying
107 prism sheet
108, light diffusion sheet for overlaying

The invention claimed is:

1. A light diffusion sheet for overlaying to be provided between a liquid crystal panel and a prism sheet in a backlight unit of a liquid crystal display device, the light diffusion sheet comprising a substrate layer, and a light diffusion layer overlaid on the substrate layer on a side of the substrate layer closer to the liquid crystal panel,
the light diffusion layer comprising a resin matrix, and resin beads dispersed in the resin matrix such that lack in uniformity of luminance resulting from a shape of the prism sheet, and generation of a sparkle resulting from interference with a pixel pitch of the liquid crystal panel, are reduced,
wherein,
a mode diameter in a volume-weighted particle size distribution of the resin beads is no less than 2.5 µm and no greater than 5.5 µm,
a density of the resin beads per unit area is no less than 9,000 beads/mm$^2$ and no greater than 24,000 beads/mm$^2$,
an average thickness of the light diffusion layer is no less than 2 µm and no greater than 9 µm, and
a percentage content of the resin beads in the light diffusion layer is no less than 31% by mass and no greater than 50% by mass.

2. The light diffusion sheet for overlaying according to claim 1, wherein a coefficient of variation of particle size in the volume-weighted particle size distribution of the resin beads is no greater than 42%.

3. The light diffusion sheet for overlaying according to claim 1, wherein a particle size amplitude in the volume-weighted particle size distribution of the resin beads is no less than 13 µm and no greater than 20 µm.

4. The light diffusion sheet for overlaying according to claim 1, wherein an average particle diameter D50 on the volume-weighted particle size distribution of the resin beads is no greater than 5.7 µm.

5. The light diffusion sheet for overlaying according to claim 1, wherein an arithmetic average roughness Ra of a front face of the light diffusion layer is no less than 0.3 µm and no greater than 1 µm.

6. The light diffusion sheet for overlaying according to claim 1, wherein a ten-point mean roughness Rz of a front face of the light diffusion layer is no less than 1.5 µm and no greater than 4.5 and an average length RSm of a roughness curve element is no less than 30 µm and no greater than 100 µm, the average length RSm being obtained in accordance with JIS-B0601:2001.

7. The light diffusion sheet for overlaying according to claim 1, wherein the resin beads in the light diffusion layer are substantially spaced away from a substrate layer surface.

8. A backlight unit for a liquid crystal display device comprising:
an optical waveguide sheet for guiding rays of light that enter from an end face to a front face side;
a light source for allowing an end face of the optical waveguide sheet to be irradiated with rays of light;
a light diffusion sheet for underlaying that is superposed on a front face side of the optical waveguide sheet;
a prism sheet provided on a front face side of the light diffusion sheet for underlaying; and
a light diffusion sheet for overlaying that is superposed on a front face side of the prism sheet,
wherein as the light diffusion sheet for overlaying, the light diffusion sheet for overlaying according to claim 1 is used.

9. The backlight unit according to claim 8, wherein a ratio of an average particle diameter D50 of the resin beads to an average pitch of ridgelines on the prism sheet is no less than 0.06 and no greater than 0.25.

* * * * *

UNITED STATES PATENT AND TRADEMARK OFFICE
CERTIFICATE OF CORRECTION

PATENT NO. : 10,222,518 B2
APPLICATION NO. : 15/370713
DATED : March 5, 2019
INVENTOR(S) : Tadayuki Nonaka Page 1 of 1

It is certified that error appears in the above-identified patent and that said Letters Patent is hereby corrected as shown below:

In the Claims

Column 28 Claim 6, Line 45 should be corrected as follows:
From:
". . . greater than 4.5 and an average length RSm of a roughness . . ."
To:
--. . . greater than 4.5 μm and an average length RSm of a roughness . . .--

Signed and Sealed this
Twenty-eighth Day of May, 2019

Andrei Iancu
*Director of the United States Patent and Trademark Office*